United States Patent Office 3,804,758
Patented Apr. 16, 1974

3,804,758
SCREEN CHANGER
John Leslie Edward Cooper, Denmead, and Peter Alan Morris, Locksheath, England, assignors to Cosham Engineering and Design Limited, Waterlooville, Hampshire, England
Filed Mar. 29, 1972, Ser. No. 227,831
Claims priority, application Great Britain, Aug. 4, 1971, 91,115/71
Int. Cl. B01d 29/02
U.S. Cl. 210—65
13 Claims

ABSTRACT OF THE DISCLOSURE

A screening device for removing foreign matter from a flowable material and having an arrangement for replacing a dirty screen with a clean screen, the device including a body member, a plurality of separate screen blocks one of the blocks being slidably guided to a position across a material passageway through the body while the other block is positioned adjacent the passage within the body, conduits formed in the body to bleed material from the passage to the other block, a valve for controlling the flow of material through the conduits, and drive means operable to cause the other block to push the one block from its location in the passage so as to replace it therein.

---

This invention relates broadly to a screening device for removing foreign matter from a flowable material passing through the device, and more particularly relates to a means for replacing a dirty or blocked screen with a clean screen; the invention is particularly applicable to the removal of foreign matter from flowable plastics material prior to the material being feed to an extrusion die machine where it is extruded in strand or sheet form.

According to the invention, there is provided a screening device having an arrangement for replacing a dirty or blocked screen with a clean screen, said device comprising a body member having a passage therethrough for the flow of material to be screened and having a rectilinear slideway extending transversely of the passage, at least two separate screen blocks each including a plurality of bores therein communicating with opposite faces of the block the blocks being slidably guided in the slideway to enable one of the blocks to be located in an operative position in the passage whilst the other block is positioned adjacent the passage and within the body member, conduits formed in the body member to permit material to be bled from the passage through a first of said conduits into the interior of the other block whilst adjacent the passage to fill the block interior and to remove therefrom air or air and foreign matter through a second of said conduits communicating with the exterior of the body member valve means disposed in one of said conduits for controlling the flow of material through the conduits, and drive means operable to cause said other block to push said one block from its location in said passage so as to replace it therein.

Figure 1:
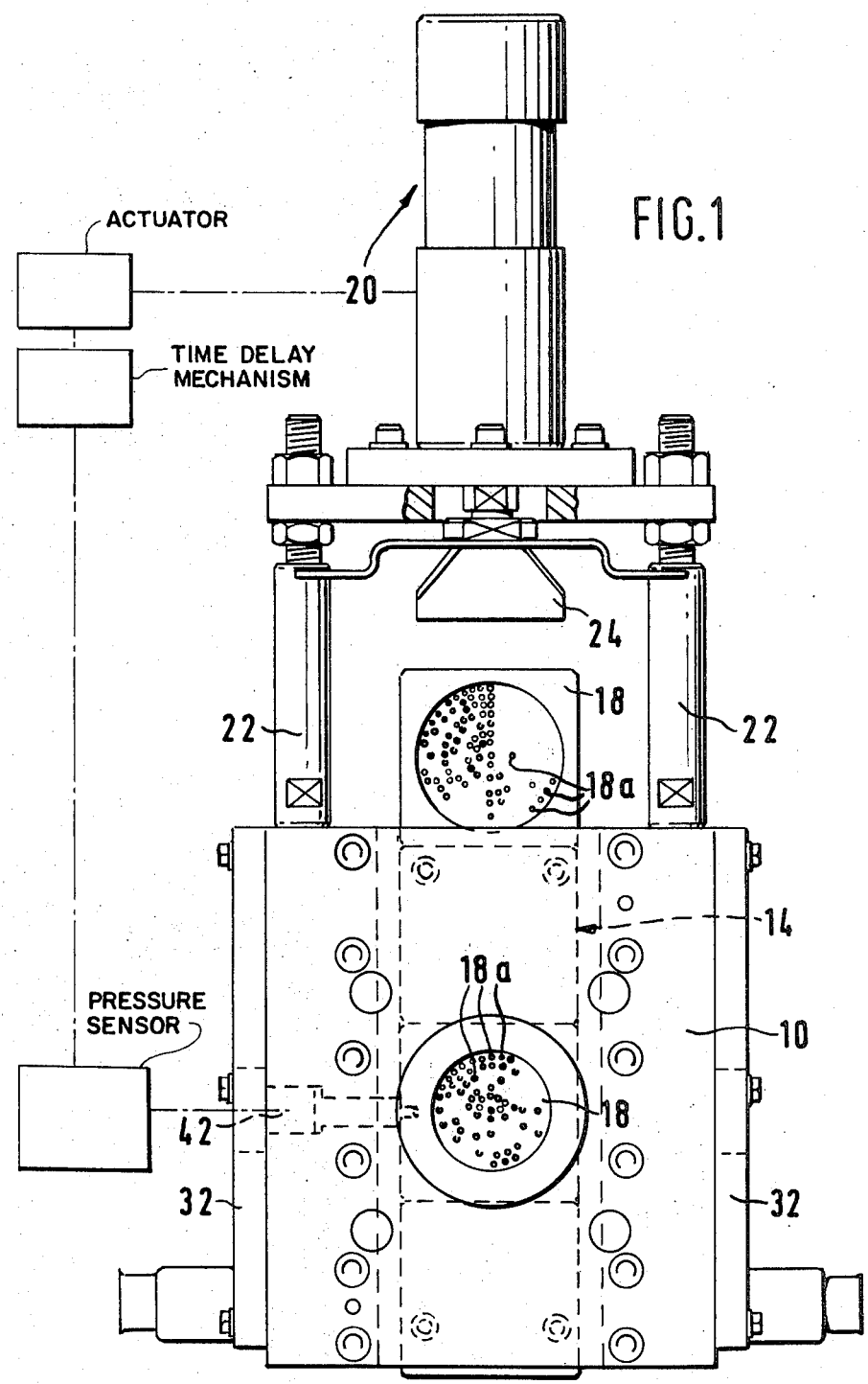
Figure 2:
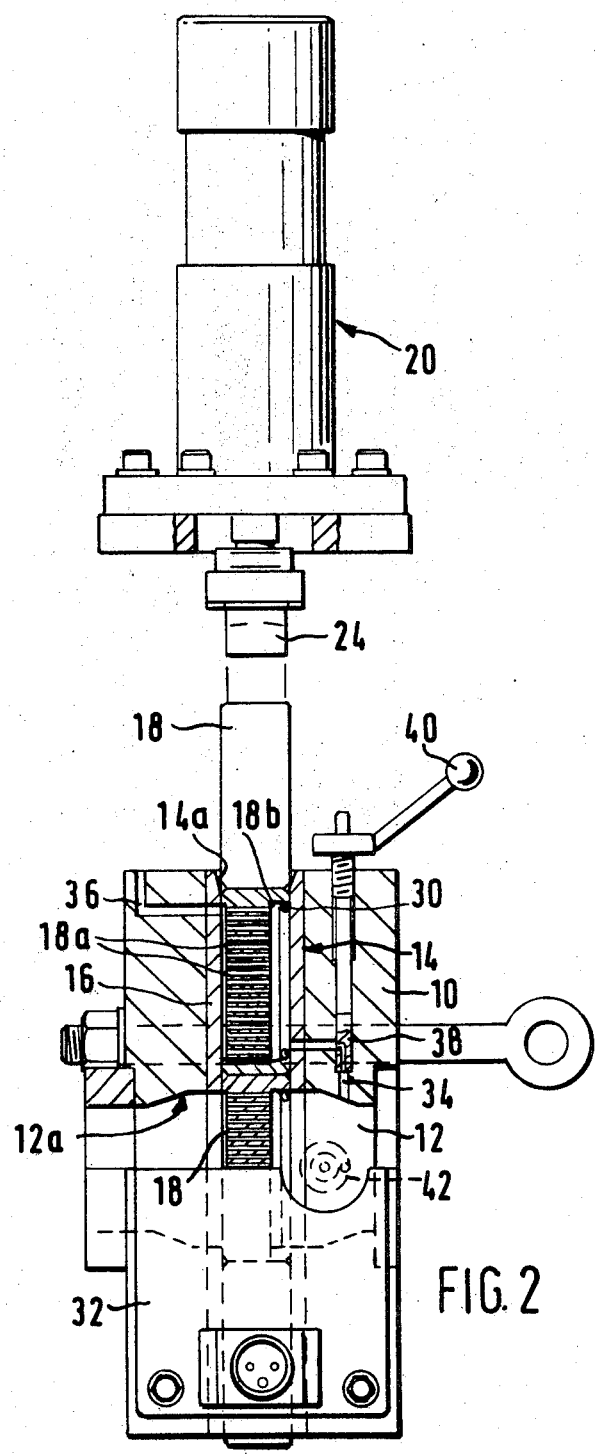
Figure 3:
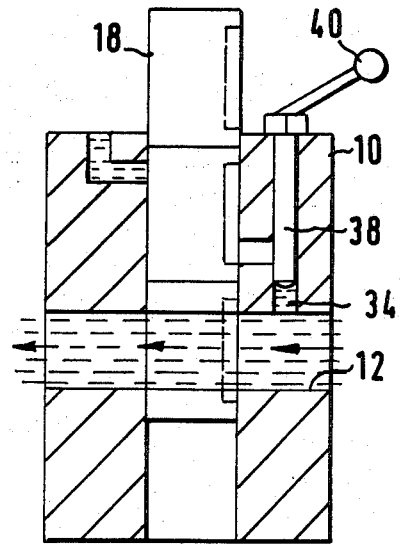
Figure 4:
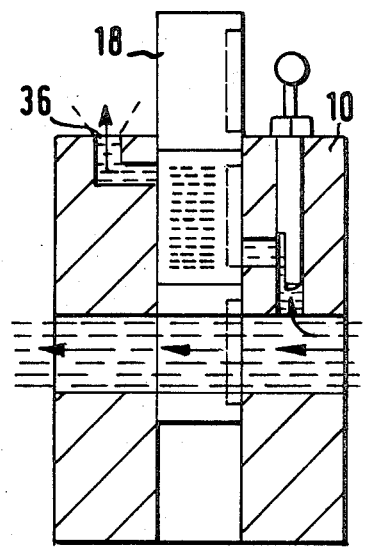
Figure 5:
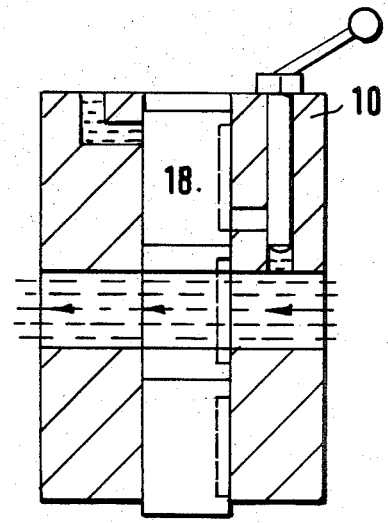
Figure 6:
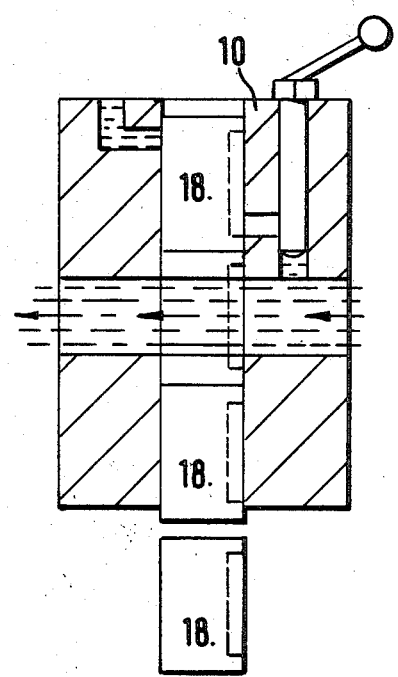

An embodiment of the invention will now be described by way of example only with reference to the accompanying drawings, in which:

FIG. 1 is a front view of a screen changer device according to the invention showing four screen blocks in position, FIG. 2 is a side view partly in section of the device of FIG. 1, and FIGS. 3 through 6 show the sequence of events during a screen changing operation with the device of FIG. 1.

Referring to the drawings the device includes a body 10 having a passage 12 therethrough for the flow of material to be screened, in this embodiment a plasticized or flowable plastics material. Extending transversely of passage 12 is a rectilinear slideway 14 lined by specially treated, replaceable bearing plates 16. The length of the slideway is such that three accurately machined screen blocks 18 can be positioned in end-to-end relationship within the body 10, also the slideway is arranged so that with one block in the passage 12 the remaining two blocks are positioned within the body on opposite sides of the passage. To position the blocks in the slideway, there is provided a hydraulic piston and cylinder unit 20 secured by spacer posts 22 to one end of the body and having a ram 24 secure to the piston, the ram being operable, when a block is located at the slideway entrance defined by tapered surfaces 14a and the unit 20 actuated, to force that block into the slideway to a location adjacent passage 12. By placing a second block at the slideway entrance and again actuating unit 20, the second block will engage and move the first block by a distance equal to the length of one block to a position in which it is located across passage 12, the second block being positioned adjacent the passage.

Each block includes a series of bores 18a therein communicating with opposite major surfaces of the block and disposed over a major portion thereof, one of the major surfaces having a recess 18b for receiving one or more filter gauzes 30 which in use remove any foreign matter from the material flowing through passage 12.

To maintain the plastics material in a flowable condition, electric plate heaters 32 are secured to the opposite side faces of the body 10.

The body is also provided with a bleed system to eliminate all air or air and foreign matter from the above-mentioned second or stand-by block when the block is positioned adjacent passage 12. The system includes a first bleed conduit 34 communicating with the passage upstream of the blocks and with one side of the slideway in the region of the lower part of the second block, and a second bleed conduit 36 communicating with an opposite side of the slideway in the region of the upper part of the second block and with the exterior of the body, the conduit 34 being controlled by a rotatable valve 38 having a handle 40.

Normal screening operation of the device is shown in FIG. 3a which also shows a third block positioned at the slideway entrance. When a pressure sensor, upstream at location 42 of the body, attains a preset level indicating a dirty or blocked filter gauze in the operative block, an indicator or alarm will be effected to indicate the need for a screen change.

The screen change operation is as follows:

Valve 38 is opened (FIG. 3b) by means of handle 40 to bleed plastics material from the upstream side of the blocks into the interior of the stand-by block via its filter screen; bleeding is continued until it is apparent from visual inspection of the outlet of conduit 36 that no further air is being expelled from the interior of the second block. The valve 38 is then closed and unit 20 actuated (FIG. 3c) to force the third block into the slideway causing the dirty screen to be rapidly replaced by the stand-by screen which is both preheated and filled with plastics material. During the change-over operation, it will be apparent that the flow of material through the passage 12 is not seriously interrupted since, due to the selected block bore pattern, the effective number of bores 18a of the dirty and stand-by blocks located in the passage 12 during change-over is not appreciably reduced; in addition, the tapered portion 12a of the passage downstream of the blocks will assist in reforming the stream of plastics material should it become interrupted.

To effect a further screen change, a fourth screen block is positioned at the slideway entrance and the above described operation repeated; in so doing, the dirty screen block located adjacent the passage will be expelled from the slideway (FIG. 3d).

A spare, fifth, block is also provided.

If desired the change-over operation can be effected automatically, in which case an actuator would actuate the valve in dependence upon the upstream material pressure sensed by the above-mentioned sensor, and also a time delay mechanism controlling operation of the unit 20.

Advantages of the above described screen change are as follows:

(1) All air and foreign matter are excluded from the stand-by block, and the change-over operation can be completed in a few seconds.

(2) The blocks are so designed that the material passage is at no time closed during the change-over time, hence "down time" is completely eliminated.

(3) The working slideway surfaces are easily replaceable.

(4) The blocks can be easily removed from the body for cleaning.

(5) The device is simple to use, efficient in operation and inexpensive.

What is claimed is:

1. A screening device comprising, a body member having a passage therethrough for the flow of a material to be screened and having a rectilinear slideway extending transversely of the passage; at least two separate screen blocks each including a plurality of bores therein communicating with opposite faces of the block, the blocks being slidably guided in the slideway to enable one of the blocks at a time to be located in an operative position extending across the passage permitting material to pass through the bores whilst the other block is positioned in a standby position in spaced adjacent relation to the passage and within the body member; first and second conduits formed in the body member, the first conduit extending from the passage to one face of the other block to bleed a portion of the material into the bores of the other block to fill the same, the second conduit extending from the exterior of the body member to the opposite face of the other block for removal from the bores thereof of air and foreign matter, valve means disposed in one of said conduits for controlling the flow of material through the conduits, and drive means operable to cause said other block to push said one block from its location in said passage so as to replace it therein with said other block.

2. A device according to claim 1, wherein said conduits are disposed on opposite sides of the slideway.

3. A device according to claim 1, further including a third screen block, wherein the slideway is of sufficient length to accommodate the three screen blocks in end-to-end relationship and is arranged so that with one block located in and extending across the passage the remaining two blocks are positioned within the body member on transversely opposite sides of the passage.

4. A device according to claim 3, and including a fourth screen block slidably guided in the slideway.

5. A device according to claim 1, wherein said drive means comprises a ram movably connected with said body member, said ram operable when actuated, to displace any screen block in the slideway by an amount equal to the length of a block.

6. A device according to claim 5, wherein the slideway includes an entrance, the ram being operable to engage one of the screen blocks when the one screen block is located at the entrance to the slideway and to force the one screen block into the slideway thereby moving the other screen blocks positioned in the slideway.

7. A device according to claim 5, wherein the ram has a fluid operated cylinder secured by means of spacer posts to one end of the body member.

8. A device according to claim 1, wherein each screen block includes a filter gauze extending across one of said faces thereof.

9. A device according to claim 1, and including means connected with said body member responsive to the pressure of the material for automatically effecting replacement of the one block by the other in the passage in response to a predetermined pressure of the material.

10. A method of changing screen blocks during screening of a flowable material utilizing at least two of the screen blocks slidably mounted in a body member and movable transversely into registry one at a time with a passage in the body member through which the material is flowing, the method including the steps of:

positioning one of the blocks in an operative position in registry with the passage extending thereacross for flow of the material through a plurality of bores extending through the one block;

positioning the other of the blocks in a standby position in spaced, adjacent relation to the passage;

bleeding a portion of the material from the passage to one side of the other block to fill the bores therein while permitting air and foreign matter to be expelled from the bores; and thereafter moving the other block to push the one block out registry with the passage and replace it therein with the other block.

11. A method according to claim 10, wherein material is bled from upstream of the screen block in the operative position.

12. A method according to claim 11, wherein material passes through a filter gauze of said other screen block before entering the bores thereof.

13. A method according to claim 10, wherein the pressure of the material upstream of the body member is sensed and when it reaches a preset value said bleeding and moving steps are effected automatically.

References Cited
UNITED STATES PATENTS

| | | | |
|---|---|---|---|
| 2,786,504 | 3/1957 | Samler | 210—236 X |
| 3,243,849 | 4/1966 | Jourkainen | 210—340 |

JOHN ADEE, Primary Examiner

U.S. Cl. X.R.

210—97, 236, Dig. 15